United States Patent [19]

Douglas et al.

[11] Patent Number: 5,207,284
[45] Date of Patent: May 4, 1993

[54] MECHANICAL SCALE CONVERSION SYSTEM

[75] Inventors: Alec T. Douglas; Harry J. Keen, both of St. Johnsbury, Vt.

[73] Assignee: Fairbanks, Inc., Kansas City, Kans.

[21] Appl. No.: 797,426

[22] Filed: Nov. 22, 1991

[51] Int. Cl.⁵ .......................................... G01G 21/28
[52] U.S. Cl. ................................. 177/241; 177/180; 177/226; 177/245; 177/165
[58] Field of Search ............... 177/180, 241, 226, 245, 177/165

[56] References Cited

U.S. PATENT DOCUMENTS

| | | | |
|---|---|---|---|
| 3,809,171 | 5/1974 | Hutchinson et al. | 177/165 |
| 4,008,776 | 2/1977 | Kushmuk | 177/241 X |
| 4,153,125 | 5/1979 | Hutchinson et al. | 177/241 X |
| 4,173,263 | 11/1979 | Meeks | 177/210 EM |
| 4,238,784 | 12/1980 | Keen et al. | 177/210 R X |
| 4,253,534 | 3/1981 | Hall et al. | 177/241 |
| 4,796,212 | 1/1989 | Kitagawa | 177/25.11 X |
| 4,858,145 | 8/1989 | Inoue et al. | 177/25.11 X |

*Primary Examiner*—Benjamin R. Fuller
*Assistant Examiner*—Randy W. Gibson
*Attorney, Agent, or Firm*—Bryan Cave

[57] ABSTRACT

A load indicator conversion system is disclosed for converting a scale having a mechanical measuring system, such as a conventional portable beam scale, into a scale having an electronic measuring system for providing an electronic display, such as an LCD display, corresponding to the load applied to the mechanical load receiver of the scale, such as the scale platform [104], which is mechanically linked via the beam load rod assembly [110] and an s-hook arrangement [150] to a load cell transducer [1]. A single common temperature sensor is employed adjacent the load cell and the associated electronics to provide information on the variations in temperature to the microprocessor for enabling temperature compensation to take place. The mechanical linkable between the transducer and the existing mechanical load receiving member is accomplished by removing the balance beam [106] and connecting the load cell [1] to the beam load rod [110] which normally mechanically transfers the applied load from the scale platform to [104] the balance beam [106].

23 Claims, 14 Drawing Sheets

MECHANICAL SCALE CONVERSION SYSTEM

CROSS-REFERENCE TO RELATED APPLICATION

This application is related to the commonly owned pending United States patent application Ser. No. 785,539, filed Oct. 31, 1991 entitled "Low Power Electronic Measuring System", naming Harry J. Keen and Leon E. Saucier as joint inventors, thereof, the contents of which are specifically incorporated by reference herein in their entirety.

BACKGROUND OF THE INVENTION

1. Field of the Invention

The present invention relates generally to electronic measuring systems, and more particularly to load indicator conversion systems for converting a scale having a mechanical measuring system into a scale having an electronic measuring system in which the load applied to the mechanical load receiver is converted into an electronic display.

2. Description of the Prior Art

Mechanical scales in which a load is applied to a mechanical load receiving member, such as a calibrated spring assembly and platform, in order to mechanically control a balance mechanism in order to mechanically provide a weight indication, such as in a conventional portable beam scale, bench scale, or health scale are well known in the art. In addition, electronic systems which measure weight to provide an electronic display based on a load applied to a transducer, such as an analog load cell or a digital load cell, such as disclosed in U.S. Pat. Nos. 3,850,023; 3,665,169; 3,603,298; 4,330,837; 4,143,724; 4,722,406; and 4,137,568 are also well known in the art, as are the use of electronic checkweighers, such as disclosed in U.S. Pat. Nos. 4,321,439; 3,446,299; 3,770,969; and 4,363,408. However, applicants are not aware of any systems which can efficiently, and relatively inexpensively, convert conventional existing mechanical scale into a modern electronic scale so as to provide an electronic display of the magnitude of the load applied to the existing mechanical load receiving member and/or to provide an electronic checkweigher from the existing mechanical scale. This is particularly important in commercial environments where costly mechanical scales are still functional and need not be discarded in order to achieve all of the benefits and advantages desired and needed today in a modern electronic measuring system.

Typically, in prior art electronic scales, a continuous voltage is applied across a load cell arranged in a wheatstone bridge. The voltage across the load cell output is measured, from which the magnitude of the load applied to the load cell is determined. Many of these prior art electronic scales have been battery operated. In early electronic scales of this type, the electrical components and the load cell each used comparatively large amounts of power. With the advent of digital circuitry, the power consumption of the logic components begin to shrink as compared to the load cell and systems were developed to reduce load cell power consumption, such as disclosed in U.S. Pat. No. 4,238,784 which employs an electronic measuring system with a constant dual-frequency pulsed power supply for pulsing the power at the load cell input, thereby utilizing less power than with a continuous D.C. power supply.

However, as noted in the above referred to contemporaneously filed copending patent application, even with such prior art pulsed systems, the zero reading of the transducer tends to drift. This effect is ordinarily caused by temperature changes in the system and by residual voltages in the system during a no pulse cycle. Various techniques have been applied to compensate for drift, such as disclosed in U.S. Pat. No. 4,238,784, however, although satisfactory in some circumstances, such prior art techniques do not enable the pulses to be varied with respect to duty cycle and frequency to thereby further reduce power consumption to lower desired levels.

In order to try to compensate for effects caused by temperature changes in prior art battery operated scales, separate temperature sensors have been employed for separately housed detection and display circuitry, as discussed in the aforementioned copending contemporaneously filed patent application. However, such a prior art arrangement has not only resulted in increased cost, but has also resulted in reduction in correction accuracy.

In the past, when prior art electronic scales were used as checkweighers, they generally incorporated separate display elements to indicate an over/under condition, such as a series of LED's. However, such a prior art arrangement not only adds to the cost of the scale by requiring additional display elements and space on the display face, but the LED's employed also increase the power consumed by the system and further exacerbate the unwanted problem of heat in the casing.

These prior art difficulties with electronic scales, and particularly battery operated electronic scales, having further added to the difficulty in providing an efficient low cost alternative to the previously acceptable mechanical scales which have not as yet outlived their useful life. These disadvantages of the prior art are overcome by the present invention.

SUMMARY OF THE INVENTION

A load indicator conversion system is provided for converting a scale, such as a conventional portable beam scale, having a mechanical measuring system into a scale having an electronic measuring system for providing an electronic display, such as an LCD display, corresponding to the load applied to the mechanical load receiver of the scale, such as the scale platform, which is mechanically linked via the beam load rod assembly and an S-hook arrangement to a load cell transducer. The transducer, such as an analog load cell, is responsive to the applied load for providing an electrical output to a microprocessor which controls the operation of the segmented LCD display and provides temperature compensation for variations in the associated temperature of the load cell and the surrounding electronics which are contained within a common housing which is mountable on the existing scale pillar. A single common temperature sensor is employed adjacent the load cell and the associated electronics to provide information on the variations in temperature to the microprocessor for enabling the temperature compensation to take place. The mechanical linkage between the transducer and the existing mechanical load receiving member is accomplished, such as in converting a conventional portable beam scale, by removing the balance beam and connecting the load cell to the beam load rod which normally mechanically transfers the applied load from the scale platform to the balance beam. This mechanical connection is preferably accomplished by threadable connecting a load cell cable assembly having an eye hook to the load cell which is mounted on a base plate in the housing, and using the S-hook to mechanically link the load cell cable assembly to the beam load rod. The cable assembly is threadably adjusted to tension the load cell cable assembly and provide a continuous taut mechanical linkage between the load cell or transducer and the existing mechanical load receiver, such as the scale platform, in order to transfer the received load to the load cell. The electronic display, under control of the microprocessor, can be arranged to display the magnitude of the received load or, if desired, can be used as an electronic checkweigher in which the segmented LCD display is also utilized to provide an over/under indication based on the received load.

In compensating for temperature changes, the microprocessor preferably switches the input to the A/D converter in a manner so that the temperature output signal from the temperature sensor is converted in the A/D converter to a digital signal for processing in the microprocessor, thereby requiring only one A/D converter. The microprocessor is, in turn, programmed with the temperature response characteristics for the load cell and the associated circuitry and determines the value of the load applied to the load cell, via the mechanical linkage to the mechanical load receiver, by biasing the actual digital load cell signal by an amount corresponding to the temperature offset. This enables the microprocessor to provide a accurate load reading of the load applied to the mechanical load receiver.

Thus, the load indicator conversion system of the present invention enables a user of a mechanical scale of the beam load rod type to readily and efficiently convert this scale into a highly accurate electronic measuring scale without the necessity of total replacement of a totally viable, and often costly, existing mechanical scale.

DESCRIPTION OF THE PREFERRED EMBODIMENT

Figure 1:
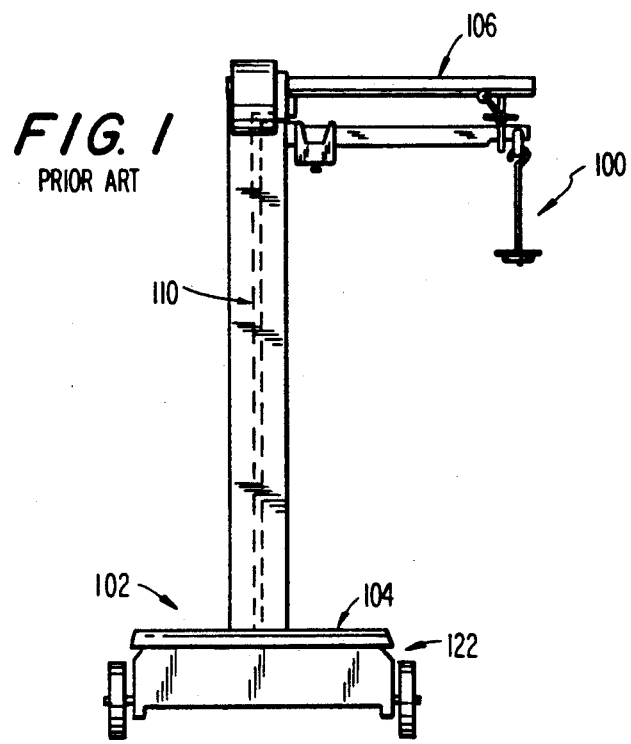
FIGS. 1-4 are various views of a conventional prior art portable beam scale, with FIG. 1 being a front elevation, FIG. 2 being a side elevation, FIG. 3 being a perspective view, and FIG. 4 being an enlarged fragmentary view of the balance beam connection to the beam load rod.
Figure 2:
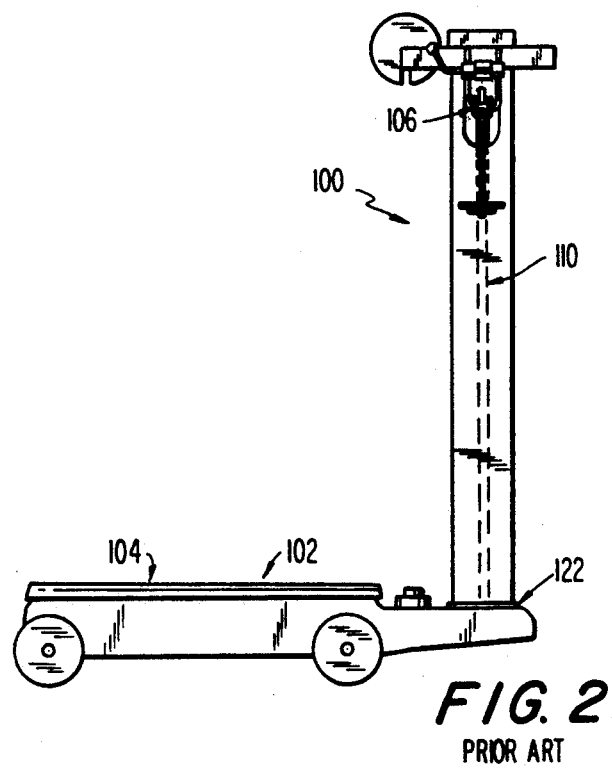
Figure 3:
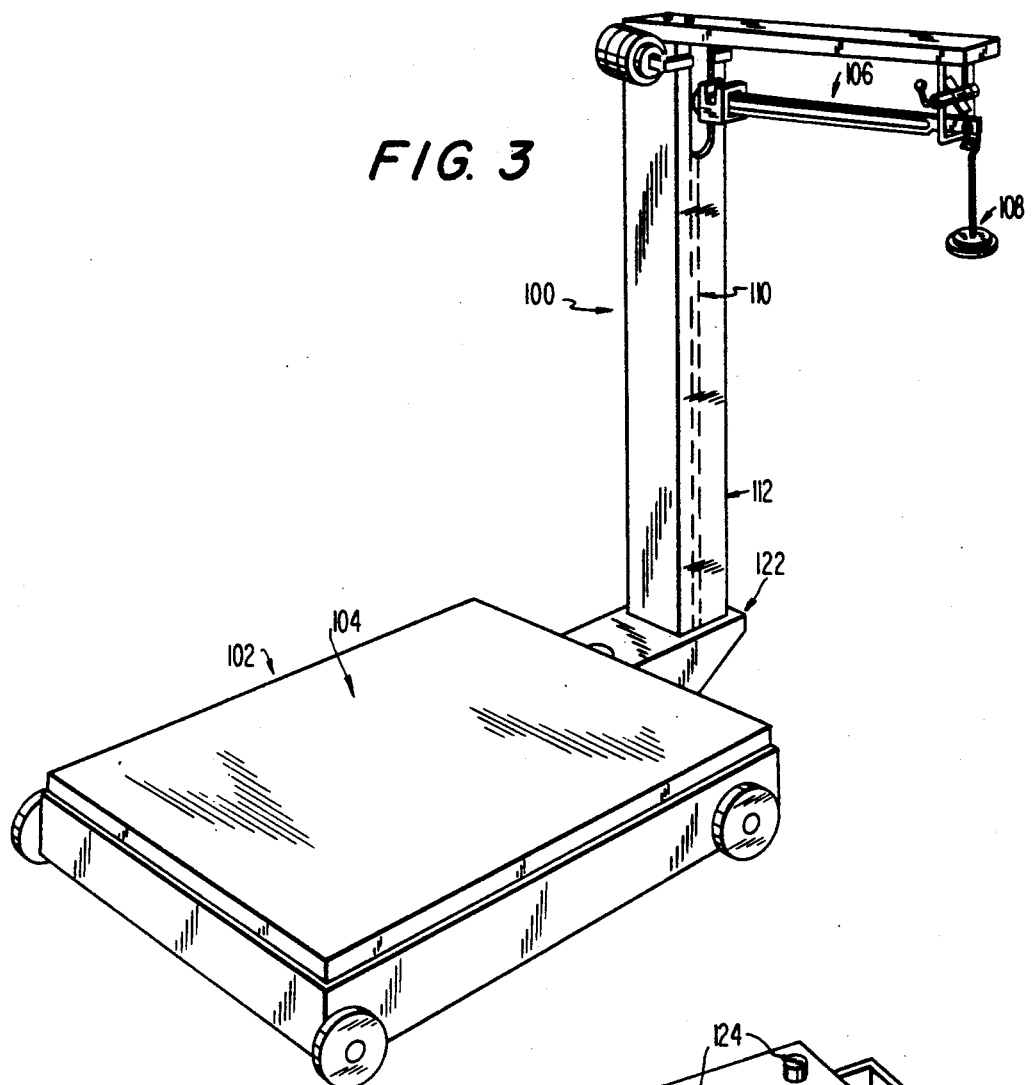
Figure 4:
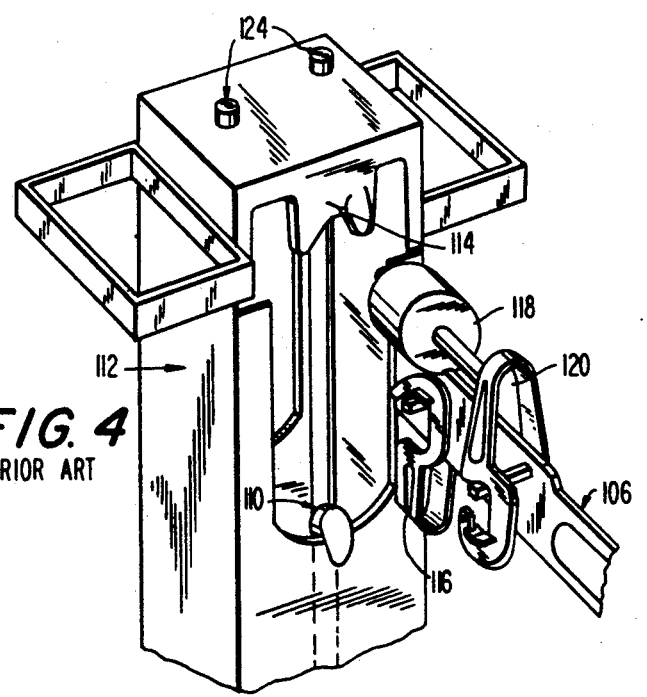
Figure 5:
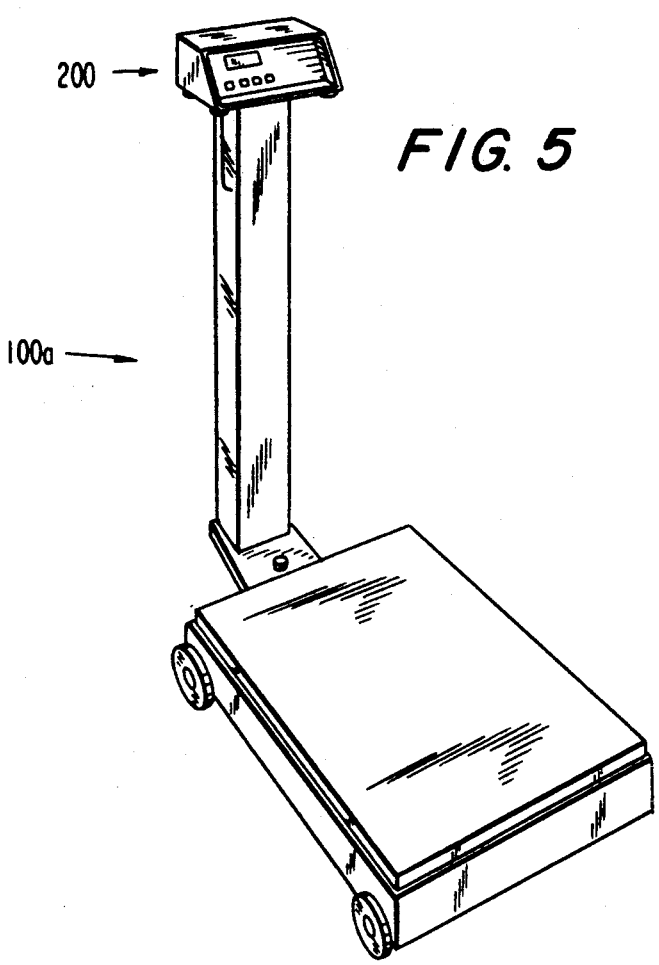
FIG. 5 is a perspective view, similar to FIG. 3, of the portable beam scale of FIGS. 1-4 after it has been converted to a scale having an electronic measuring system in accordance with the load indicator conversion system of the present invention.
Figure 6:
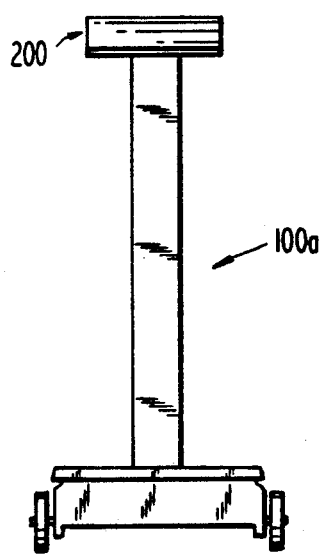
FIGS. 6-7 are front elevation and side elevations, respectively, similar to FIGS. 1-2, of the converted scale of FIG. 5.
Figure 7:
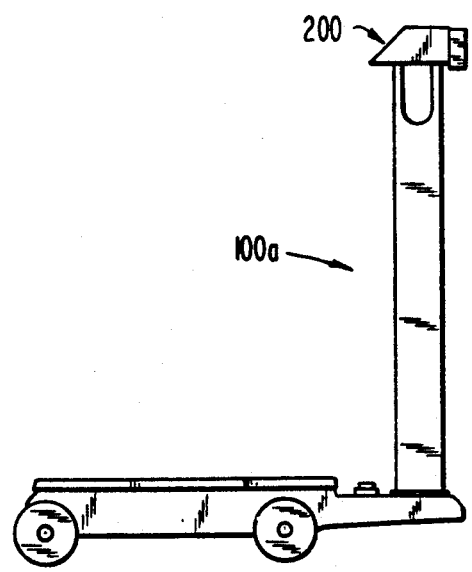
Figure 19:
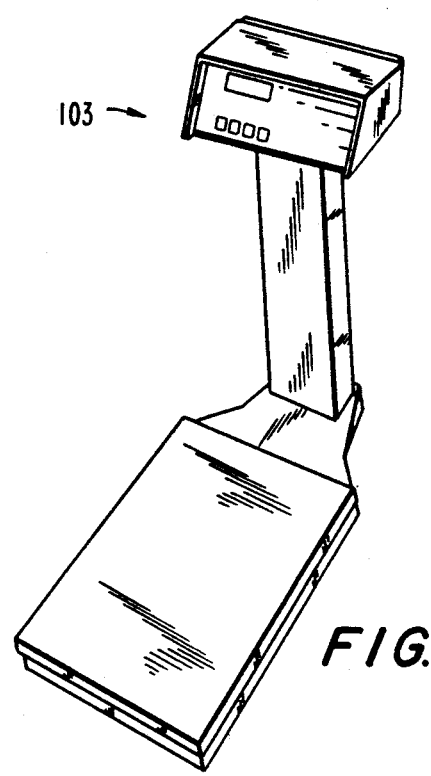
FIG. 19 is a perspective view, similar to FIG. 5, of a conventional mechanical bench scale which has been converted to an electronic scale in accordance with the present invention.
Figure 20:
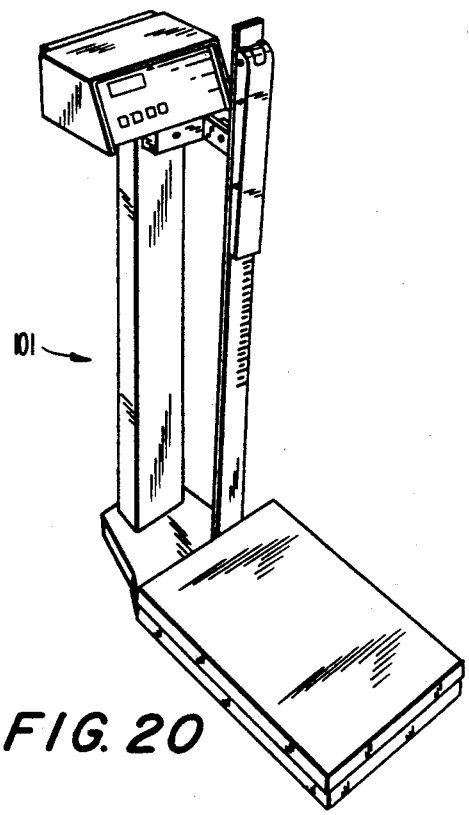
FIG. 20 is a perspective view, similar to FIG. 5, of a conventional mechanical health scale which has been converted to an electronic scale in accordance with the present invention.

By way of example, the load indicator conversion system of the present invention in which a conventional scale having a mechanical measuring system may be converted into scale having a an electronic measuring system shall be described in terms of the conversion of a conventional portable beam scale 100, although it may be employed for numerous other types of mechanical scales such as, for example, a health scale 101, such as illustrated in FIG. 20 which show such a scale after conversion, or a bench scale 103, such as illustrated in FIG. 19 which shows such a scale after conversion, particularly where such scales employ some type of beam load rod assembly to mechanically transfer load from the scale platform. Of course, although the present invention is described in terms of converting an existing mechanical scale, it is equally applicable to the original manufacture or assembly of such a scale. Referring now to the drawings in detail, and initially to FIGS. 1-4, a conventional prior art portable beam scale 100, such as a Fairbanks Model No. 1124, is shown by way of example. Suffice it to say that the conventional portable beam scale 100 includes a conventional mechanical load receiving member 102, which comprises a conventional balanced scale platform 104, and a balance beam 106 for conventionally providing a weight indication of the magnitude of the load applied to the scale platform 104 such as by obtaining a balance condition for the balance beam 106 by changing a known weight 108 hung on the beam 106 or by placing unknown items to be weighed on the scale platform 104 until the beam 106 attains a balance condition with the known weight 108 hung on the end of the beam 106 as shown in FIGS. 1-3. This type of conventional mechanical balancing in order to obtain a weight indication is well known in the art and need not be described in further detail. As further shown in FIGS. 1-4, the scale platform 104 is mechanically linked to the balance beam 106 via a conventional beam load rod 110 which conventionally extends between the scale platform 104 and the balance beam 106 to conventionally mechanically transfer the load applied to the scale platform 104 to the balance beam 106. The beam load road 110 is normally conventionally contained in a pillar 112 which is used to support the balance beam 106. As shown in FIG. 4, the balance beam 106 is supported on pillar 112 between a conventional beam hanger hook 114 and a hook on the beam load rod 110, with the balance beam 106 being conventionally mechanically connected to the beam load rod 110 via a conventional beam butt loop 116. As further shown in FIG. 4, the balance beam 106 at the pillar 112 end also conventionally includes a balance weight 118 and a beam fulcrum loop 120, with the pillar 112 being conventionally secured to the scale base 122 via pillar support rods 124.

Figure 8:
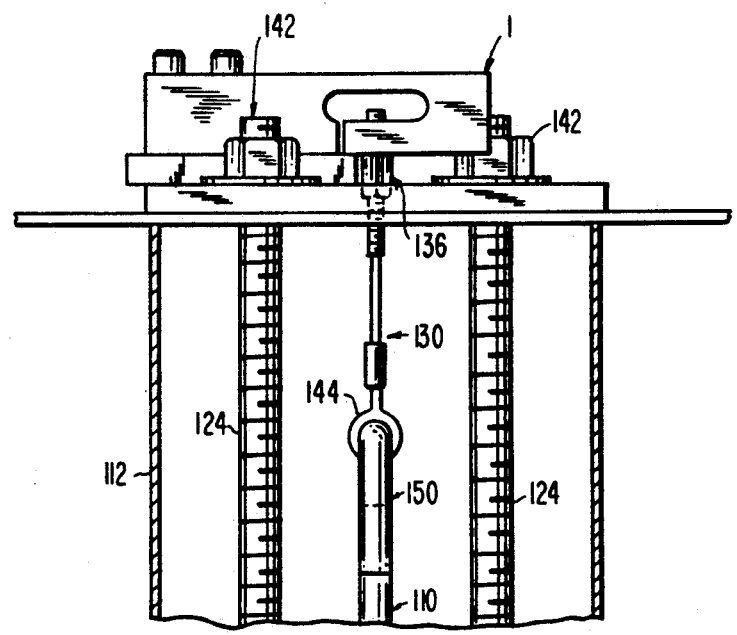
FIG. 8 is an enlarged fragmentary front view, partially in section, of the load cell mechanical connection to the beam load rod in the converted scale of FIG. 5.
Figure 9:
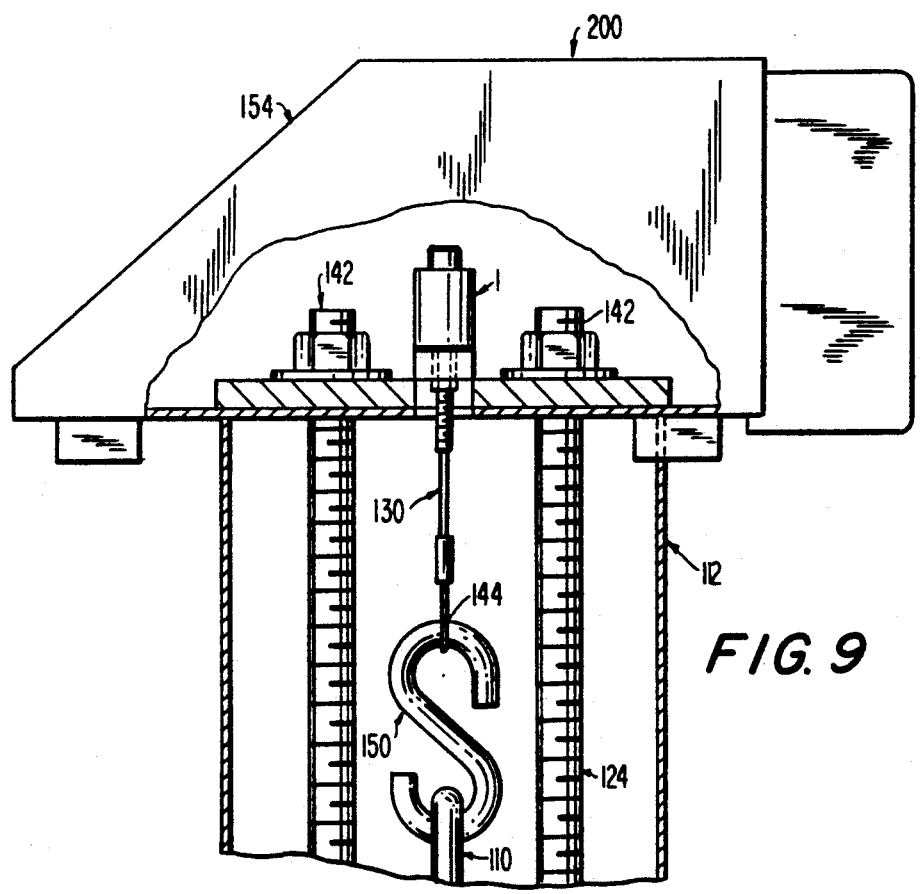
FIG. 9 is an enlarged fragmentary side view, partially in section, of the mounted load indicator housing and the load cell mechanical connection to the beam load rod in the converted scale of FIG. 5.
Figure 10:
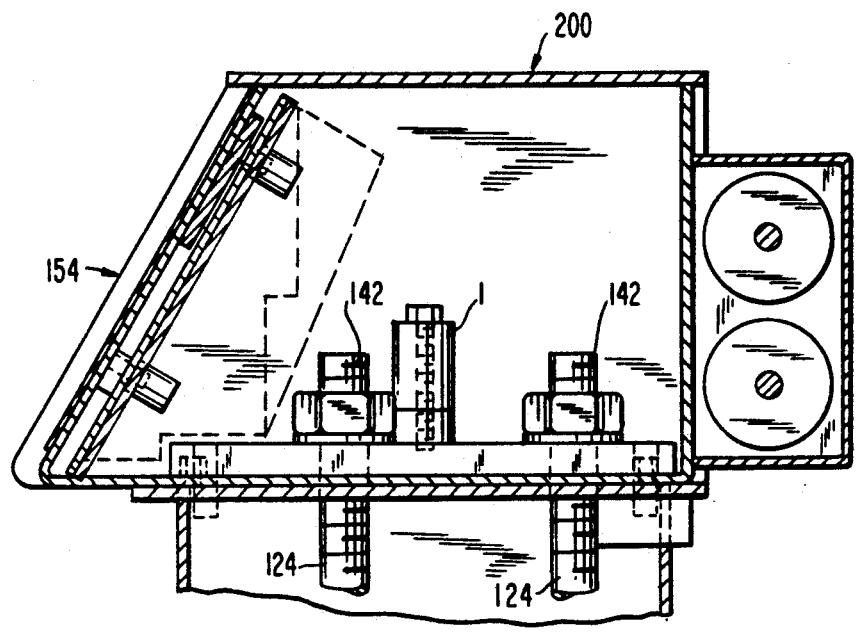
FIG. 10 is a fragmentary side view, partially in section, of the mounted indicator in the converted scale of FIG. 5.
Figure 11:
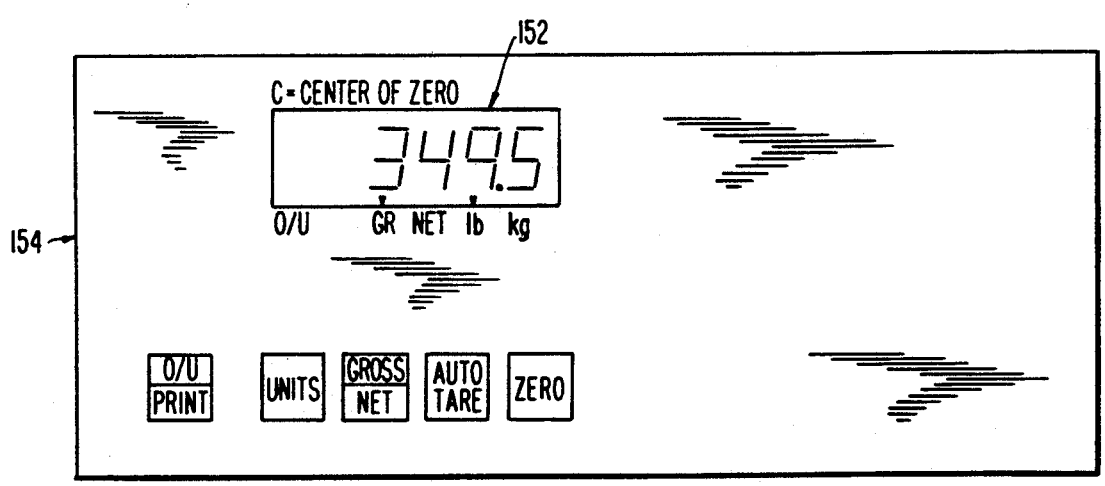
FIG. 11 is a diagrammatic illustration of a typical face plate for the indicator of FIG. 10.
Figure 12:
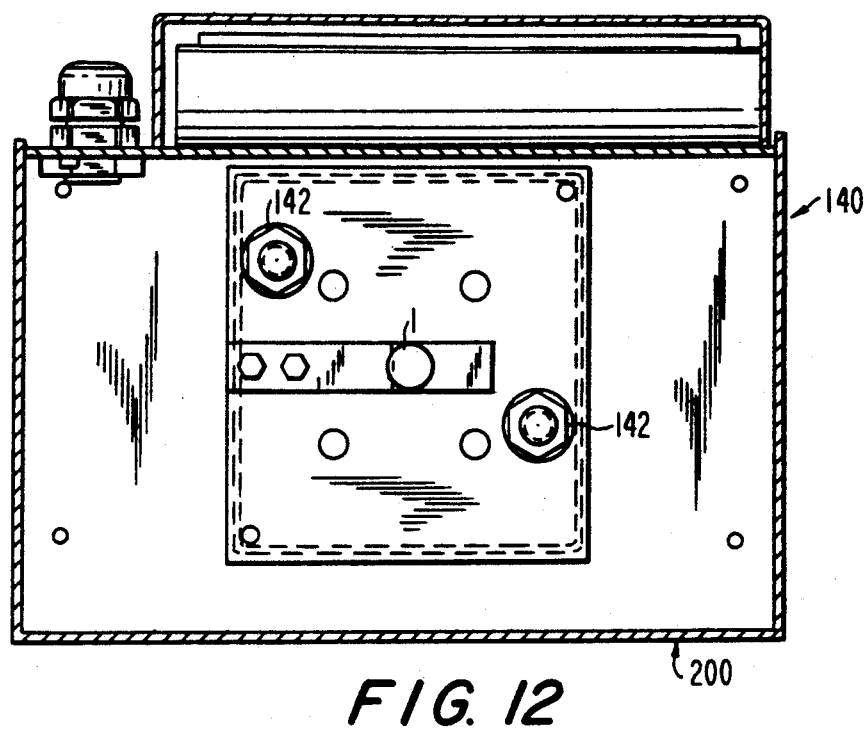
FIG. 12 is a top plan view of the base plate of the indicator of FIG. 10.
Figure 13:
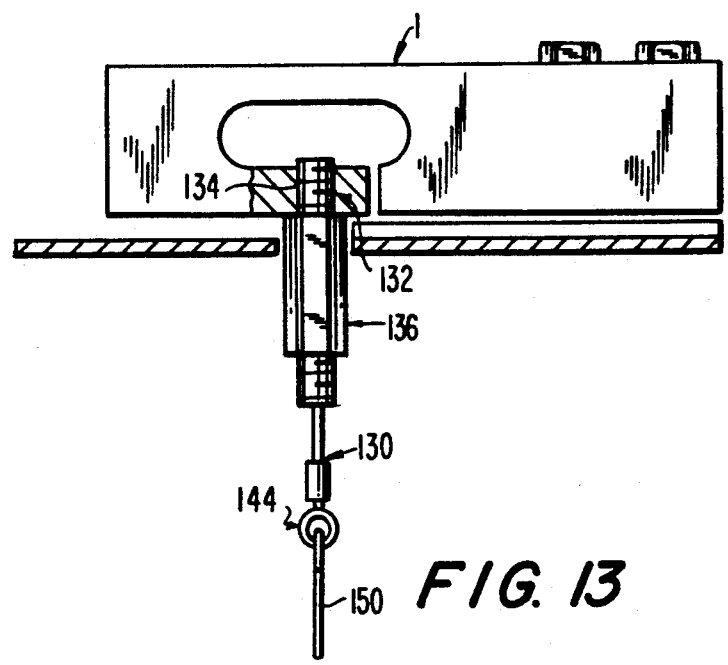
FIG. 13 is an enlarged diagrammatic illustration, similar to FIG. 8 of the load cell cable linkage assembly in accordance with the present invention.

As shown and preferred in FIGS. 5-13, the majority of the existing conventional portable beam scale 100 is employed in the converted scale 100a; however, the balance beam 106 and the associated components 108, 114, 116, 118 and 120 have been removed and replaced by the conversion indicator 200 of the present invention which, as will be described in greater detail hereinafter, is preferably mounted on the pillar 112 via attachment to the pillar support rods 124, and is mechanically linked to the beam load rod 110 to preferably transfer the mechanical load applied to the scale platform 104 to a load cell 1 contained in the conversion indicator 200, such as illustrated in FIGS. 8, 9 and 13. As shown and preferred in FIG. 13, a cable linkage assembly 130 preferably has a threaded end 132 which is threaded into a threaded hole 134 in the bottom of the load cell 1, such as a conventional analog load cell 1. Preferably a conventional hex spacer 136 is employed together with the cable linkage assembly 130. The threaded end 132 of the cable linkage assembly is preferably screwed into the load cell 1 until the lead end of the screw 132 is flush with the cut-out 134 in the load cell 1. The hex spacer 136 is then preferably tightened on the screw 132 until it is snug against the load cell 1. As shown and preferred in FIGS. 8 and 9, the base 140 on the conversion indicator 200 is mounted on the pillar rods 124 by means of conventional nuts and bolts 142.

As further shown and preferred in FIGS. 8, 9 and 13, the cable linkage assembly 130 has an eyelet 144 at the opposite end through which one end of an S-hook 150 is connected, with the other end of the S-hook 150 being connected to the beam load rod 110 to provide a taut mechanical linkage between the beam load rod 110 and the mounted load cell 1 in the conversion indicator 200 for transferring the load applied to the scale platform 104 to the analog load cell 1 for providing an electronic display on a segmented LCD display 152 located on the face 154 of the preferred conversion indicator 200. Once the load is applied to the analog load cell, it is preferably converted into an electronic display of the magnitude of the mechanically applied load to scale platform 104 or into an over/under indication in a checkweigher mode in the manner described in the aforementioned copending patent application entitled "Low Power Electronic Measuring System", incorporated in FIGS. 14-18 which correspond to FIGS. 1-5, respectively, of the application.

Figure 14:
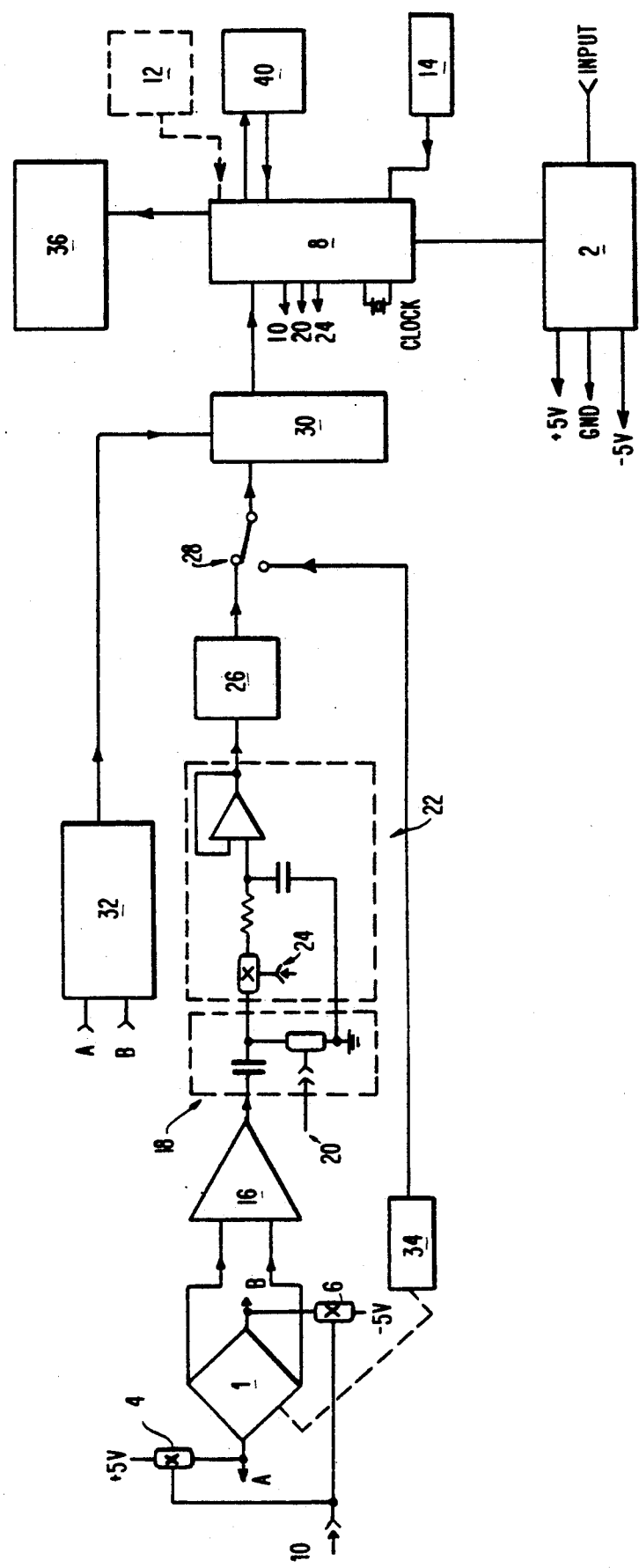
FIGS. 14, 15, 16A, 16B, 16C, 17A, 17B, 17C and 18, respectively, of the commonly owned copending contemporaneously filed patent application entitled "Low Power Electronic Measuring System.

Referring now to FIGS. 14-18 in detail, and initially to FIG. 14, the conversion indicator 200 of the present invention employs the load cell 1 to measure the weight of an object placed on the scale platform 104. Load cell 1 is a conventional load measuring device conventionally arranged in a bridge circuit. Voltage is applied across terminals A and B, to excite load cell 1, and output terminals C and D register a voltage corresponding with the load applied to the cell 1 as a result of the mechanical linkage 130, 150, 110 to the scale platform 104.

The excitation voltage driving load cell 1 is provided by a power supply 2. Power supply 2 may be any conventional DC power supply or battery or any power supply which is altered to provide a D.C. voltage. For example, a conventional 120 volt, 60 Hertz AC power supply could be rectified and converted to provide the desired DC voltage levels. Switches 4 and 6 operatively determine when power is supplied to terminals A and B from power supply 2. When switches 4 and 6 are enabled via a pulse signal line 10, the voltage from power supply 2 is provided at terminals A and B. When pulse signal line 10 is deactivated, power supply 2 is isolated from load cell 1.

In a preferred embodiment, the constant DC voltage to switches 4 and 6, by way of example, is +5 V and −5 V respectively. These voltages may vary provided that they are DC, and that the corresponding circuitry is modified accordingly, i.e. resistors and amplifiers adjusted to obtain the proper readings. It is readily foreseen that a power supply of any appropriate voltage for the system circuitry may be used.

The indicator 200 includes a conventional microprocessor 8 which handles many of the unique functions of the present invention. Previous systems known to applicants, such as disclosed in U.S. Pat. No. 4,238,784, employed electronic circuitry which produced power pulses at a fixed frequency and duty cycle. The duty cycle of the system is the ratio of working time, the time during which power is being pulsed, to the total time. The frequency is the span between successive pulses. It has been found to be advantageous in battery operated indicators, to modify the frequency and duty cycle of the pulses at the load cell to maximize battery life while providing only the minimum necessary scale resolution. Higher scale resolution requires a larger duty cycle to allow the circuitry sufficient time to accurately sample the load cell output. When the system is used to obtain higher resolution of the load, it consumes more power which results in shorter battery life. Conversely, for lower resolution, the system requires a lower duty cycle. Thus, lower resolution output results in increased system battery life.

Taking advantage of this principle, the system of the present invention preferably includes a program stored in ROM 12 which allows the desired resolution of the scale 100 to be preset via data entry device 14 located on a front panel 154 of the indicator 200. If desired, the system could include factory preset resolution options, or interface with a computer device to receive such commands.

In practice, the user will determine a preferred resolution of the scale 100 to maximize informational importance while minimizing power consumption. For example, if the desired accuracy of the system is 1/100th of the range (i.e. range of 100 lbs., accurate to the nearest pound), the user would enter these values into the system via the keyboard 14. The microprocessor 8 would then preferably utilize these values, plus other information described hereinafter to determine the minimum necessary pulse rate for the load cell 1.

Having determined the optimal frequency and duty cycle for the application, microprocessor 8 preferably sends a series of signals via pulse signal line 10 to switches 4 and 6 for preferably alternatively switching the power to load cell 1 on and off at the correct times. The system preserves power by pulsing the load cell 1 only as necessary. Thus, for high resolutions, the system may pulse several thousand times per second whereas it will pulse much slower for lower resolution applications.

The analog output from load cell 1 at terminals C and D is amplified by operational amplifier 16 and is then applied to a drift correction circuit 18. While the system is between pulses, drift correction circuit 18 stores in a capacitor any residual voltages which remain in the circuitry. Since during a no-pulse, the amplifier output should be zero, any residual voltages would tend to render subsequent output voltage readings inaccurate. Drift correction circuit 18 stores a reading of the residual voltages at the amplifier output, and subtracts this value from the output of the amplifier during the next pulse. Thus, an accurate zero reading is provided.

Drift correction circuit 18 is preferably controlled by the zero signal 20 generated by microprocessor 8. When the zero signal 20 is activated, a reading of voltage offsets will be taken. As the system duty cycle or frequency changes, microprocessor 8 preferably varies the timing signals to the system components accordingly. At higher duty cycles, zero corrections are needed more often.

The output of the drift correction circuit 18 is fed to a sample-and-hold ("S/H") circuit 22. When signalled by microprocessor 8 via S/H signal line 24, the S/H circuit 22 reads and stores the zeroed analog load cell output signal. Once the amplified output has been stored in the S/H circuit 22, microprocessor B may turn off the pulse signal line 10 and the S/H signal line 24, and may thereafter engage the zero signal 20.

The output of the S/H circuit 22 is directed through low pass filter 26. Since the input voltage is DC, any signal content which is oscillating must be noise. Generally, such noise is caused by physical oscillation of the scale, or by power supply noise. Low pass filter 26 clips all noise above a very low frequency before directing the filtered output through two-input switch 28 into analog-to-digital ("A/D") converter 30.

In order for A/D converter 30 to accurately convert the load cell output reading into digital form, this output voltage is preferably ratiometrically compared to the input voltage. Thus the magnitude of the pulse voltage which generated the load cell output is preferably stored for input into A/D converter 30. When signalled by microprocessor 8, pulse reference 32 measures and stores the voltage applied across terminals A-B. In a preferred embodiment, the signal which initiates storage of the reference voltage is the same as that of S/H signal line 24. Therefore, whenever a load cell output is sampled, pulse reference 32 will be signalled to record the reference voltage as well. The voltage is preferably stored in a capacitor. The reference voltage stored in pulse reference 32 is input into A/D converter 30 along with the filtered load cell output to provide the necessary ratiometric input. A/D converter 30 then converts the load cell analog voltage into a digital reading for the microprocessor 8.

All of the various electrical components of the indicator 200 present invention are preferably located in a common housing in very close proximity. The heat generated tends to cause the load measurement to drift as a result of the heating effect of the various components, especially the analog devices. Temperature sensor 34 is preferably placed in close proximity to the analog circuitry and load cell 1 to accurately approximate their temperatures. In a preferred embodiment, temperature sensor 34 is an integrated circuit which provides a voltage output proportional to temperature. It is readily foreseen that any appropriate conventional temperature sensor such as thermistor or other device may be utilized in the system of the present invention.

The voltage output of the temperature sensor 34, representative of the circuitry temperature, is selectively routed to A/D converter 30 through the second input of two-input switch 28 under the control of microprocessor 8. The frequency with which a temperature reading is read may be a constant (i.e. every 5 seconds) or may be variable, determined by microprocessor 8. Since temperature changes occur very slowly in contrast with load changes, it is preferable that the temperature be read at a much lower rate than load cell readings. Generally, one reading per minute or less is sufficient. However, in certain conditions it might be desirable to read the temperature value more often. If desired, microprocessor 8 might determine the rate of temperature change, and vary the frequency of temperature readings accordingly. For example, in an embodiment where power to the load cell is constant, i.e. not being pulsed, the load cell 1 will heat up and cause temperature related error. It may therefore be advantageous to take more frequent temperature readings. When no load is present, very infrequent or no temperature readings may be sufficient.

Once A/D converter 30 generates a digital value for the output of temperature sensor 34, this value is read and stored by microprocessor 8. Microprocessor 8 is preferably conventionally programmed with the temperature response characteristics for the system. This is ordinarily accomplished in one of two ways.

Firstly, the entire housing may be placed in a temperature chamber where a look-up table is generated containing the temperature response characteristics for the system over a desired range of temperatures. This look-up table is preferably stored in EEPROM 40.

Alternatively, the transducer 1 may have an associated temperature response equation, or series of coefficients which relate the load cell output to applied load and temperature. These values, ordinarily provided by the load cell manufacturer are preferably stored in EEPROM 40.

Microprocessor 8, having stored values for the system temperature and for the load cell output may determine the weight of the load applied to load cell 1. This is conventionally accomplished by utilizing either the look-up table or the coefficients as described above. The microprocessor 8 is also able to utilize the system characteristics to compensate for span errors, which occur when the load cell output varies with load and temperature. Creep errors may likewise be compensated for. Creep occurs when the load cell output varies with time, temperature and load.

For example, to reduce creep, the microprocessor 8 could store several consecutive output readings and conventionally utilize mathematical algorithms to smooth or average the readings. The use of the microprocessor 8 allows the indicator 200 of the present invention to compensate for non-linearities in the system and to more accurately correct for span and creep errors.

In order to display the computed load weight, the display 152 is provided. Display 152 ordinarily comprises a plurality of conventional seven-segment LCD's arranged to display a numerical value. Microprocessor 8 preferably contains the necessary LCD driver circuitry to display the load value on the display. Alternatively, driver devices may be provided to display the output in any conventionally known manner.

If desired, however, the system of the present invention may be operated in a checkweight mode. When operated in this mode, a desired weight and desired acceptable range are preferably entered by the system user or may be preset into keys on the display panel.

Figure 17A:
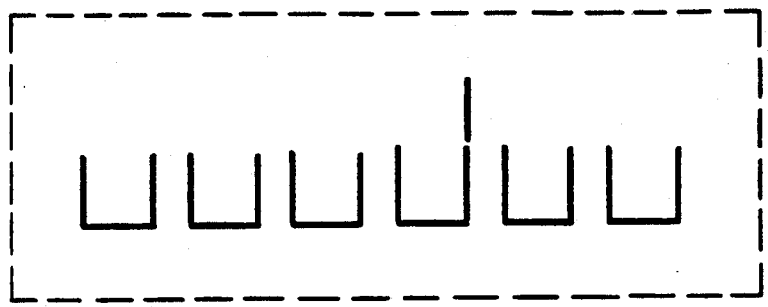

The LCD display circuitry may then preferably be utilized to relay messages to the user. Rather than utilizing additional displays, or additional circuitry, microprocessor 8 may preferably reconfigure the LCD displays for displaying the over/under mode. If the weight present is below the desired tolerance range, the LCD's preferably display lower case U's such as shown in FIG. 17A. A vertical bar preferably indicates how far below the accept range the weight is. Preferably, by way of example, each bar corresponds to 1/12 of the programmable limit.

Figure 17B:
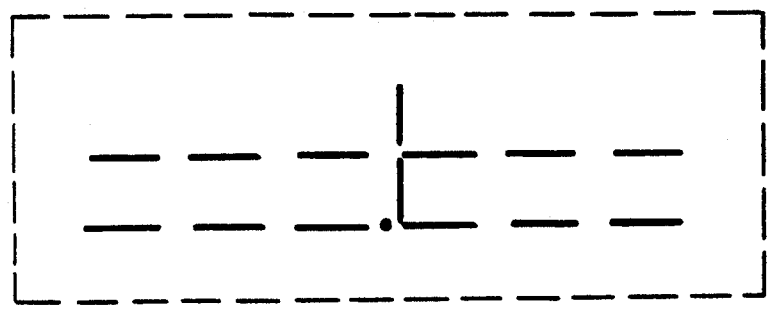

If the Weight is within the accept range, preferably horizontal bars appear, with the vertical bars indicating where in the accept range the weight is, such as shown in FIG. 17B. A decimal point in the center of the display represents the target weight. Preferably, there are six bars on each side of the target, and each one represents 1/12 of the programmable limit.

Figure 17C:
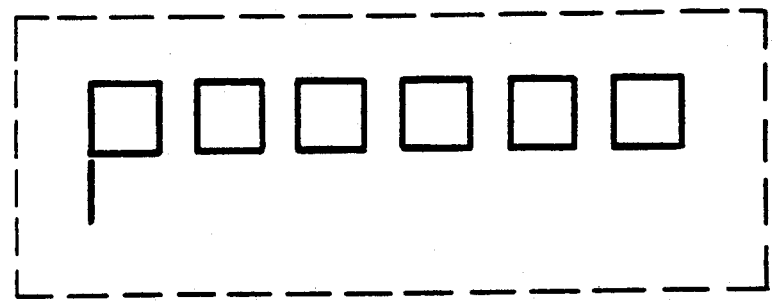

If the weight exceeds the accept range, inverted 0's preferably appear, with a vertical bar indicating how far above the accept range the weight is, such as shown in FIG. 17C. Preferably, each bar represents 1/12 of the programmable limit.

Preferably, microprocessor 8 includes the necessary driver circuitry to operate the LCD's in this mode.

For example, if it were desirable to have a scale 100 with 0.5 lb. increments determine when a box was filled to within 12 lb. of 100 lb. target, the display as shown in FIGS. 17A-17C might be used. If the weight were 10 lbs. under the target, the UNDER display indicated at FIG. 17A would be shown. FIG. 17B shows the ACCEPT display and indicates a weight 0-1 lbs. over the target value. FIG. 17C represents an OVER display, and shows approximately 6 lbs. over the target.

While the indicator 200 of the present invention includes various new and useful features, it is readily foreseen that a system may be designed which utilizes only certain of these features. For example, if power is not a consideration for the scale 100 so that pulsing is less advantageous, it would still be useful to employ a single temperature sensor for compensating for all of the components, or to implement the present novel over/under indicator.

Figure 15:
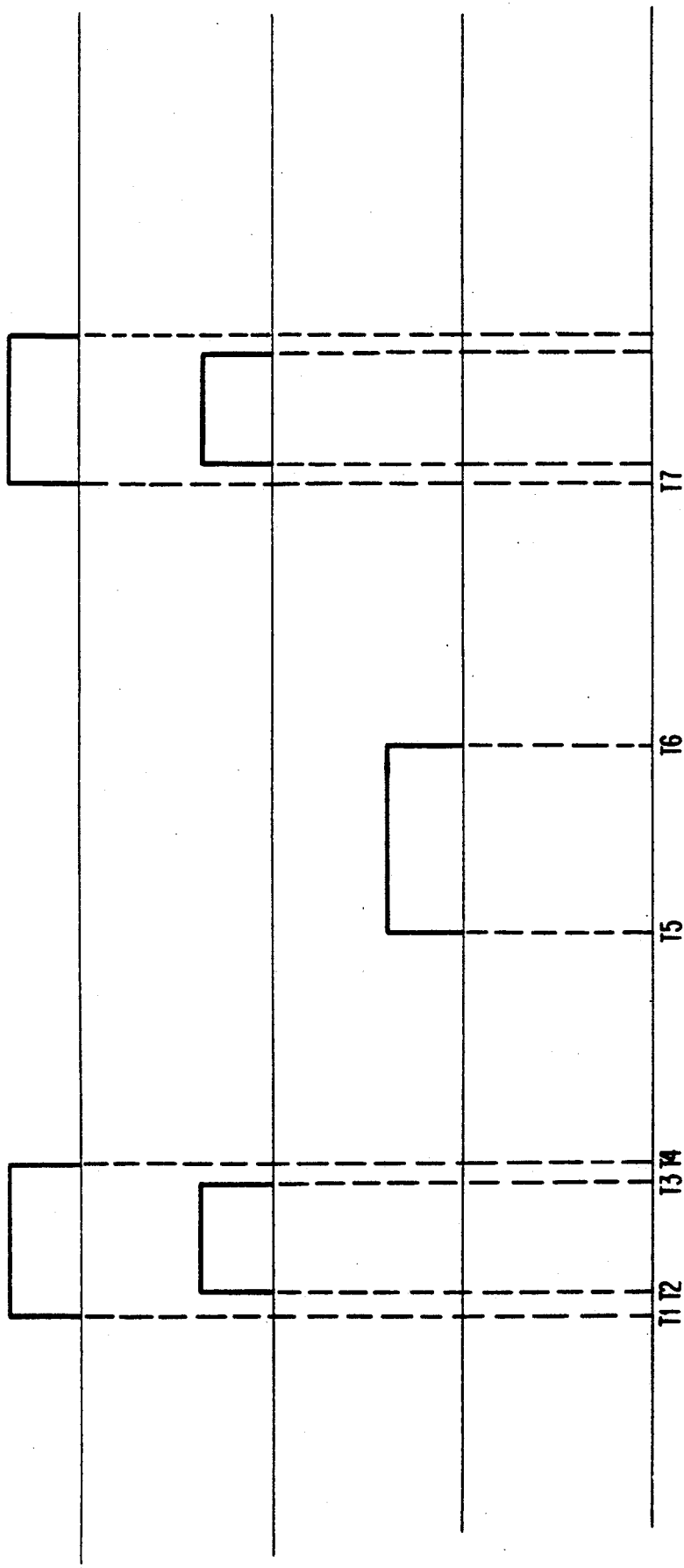

As shown in FIG. 15 microprocessor 8 must properly time the signals to the various devices for the system to operate correctly. In operation, microprocessor 8 would determine the optimal frequency and pulse width for the pulses to load cell 1 based upon desired resolution, battery life and other factors. To initiate the first pulse at time t1, microprocessor 8 sends a DC signal through pulse signal line 10 which closes switches 4 and 6 and thereby supplies power to load cell 1. A short time after the start of the pulse, at time t2, microprocessor 8 sends a DC signal through S/H signal line 24 to sample the load cell output. Substantially simultaneously, pulse reference 32 is signalled by the same S/H signal line 24 to take a measurement of the pulse voltage. If desired, microprocessor 8 may include a separate signal line for pulse reference 32. Time t2 may be any time after time t1, provided that the load cell is still being pulsed until a stable sample is taken, and that the input amplifier, load cell and zero circuitry have had sufficient time to stabilize. After a sufficient time has passed to take an accurate sample, time t3, S/H signal line 24 may be set to zero by microprocessor 8. Any time thereafter, at time t4, pulse signal line 10 may be set to zero, and the pulse ended. Thus time t1-t4 represents the pulse-width of the pulse.

After the pulse has ended, microprocessor 8 sends a DC signal through the zero signal line 20 at time t5. This actuates a switch which will store residual voltages in a capacitor. This line must be kept on for a sufficient time, until time t6, for the storage capacitor to charge. Further, the zero reading must be taken sufficiently close to the next pulse so that the capacitor will not discharge before the next S/H reading. At time t7, the pulse sequence begins again. Thus the interval of pulses is t1 −t7, and the frequency is 1/(t1-t7).

The system of the present invention preferably includes an additional feature to preserve power. Most scales are actually used for measurements only a small percentage of the time which power is actually on. Therefore, the present invention preferably includes a sleep mode to conserve power during periods of non-use. The microprocessor 8 is preferably provided with a program to determine when to place the system in the sleep mode. For example, during periods of non-use longer than a desired threshold or in response to an input from the keyboard, microprocessor 8 may initiate the sleep mode.

In the sleep mode, power is cut off from all circuitry which is not necessary. In a preferred embodiment, when the sleep mode is initiated the following events occur: 1) The power supply is signalled to reduce system voltage from +5 VDC to +3 VDC; 2) power to the voltage inverter (provides −5 VDC source) is shut off; 3) all power to the load cell, the sample and hold, the amplifier, the zero circuitry, the pulse reference and the A/D converter is terminated. It is readily foreseen that various combinations of circuitry may be shut off while the system is in the sleep mode. While system response is slow in the sleep mode due to the reduced voltage to the microprocessor, power consumption is significantly reduced.

The sleep mode may be terminated by either a user input, or by placing an object on the scale platform 104 of the scale 100. If the system 200 is attached to a separate computer, control signals to terminate the sleep mode may be externally provided.

Figure 16A:
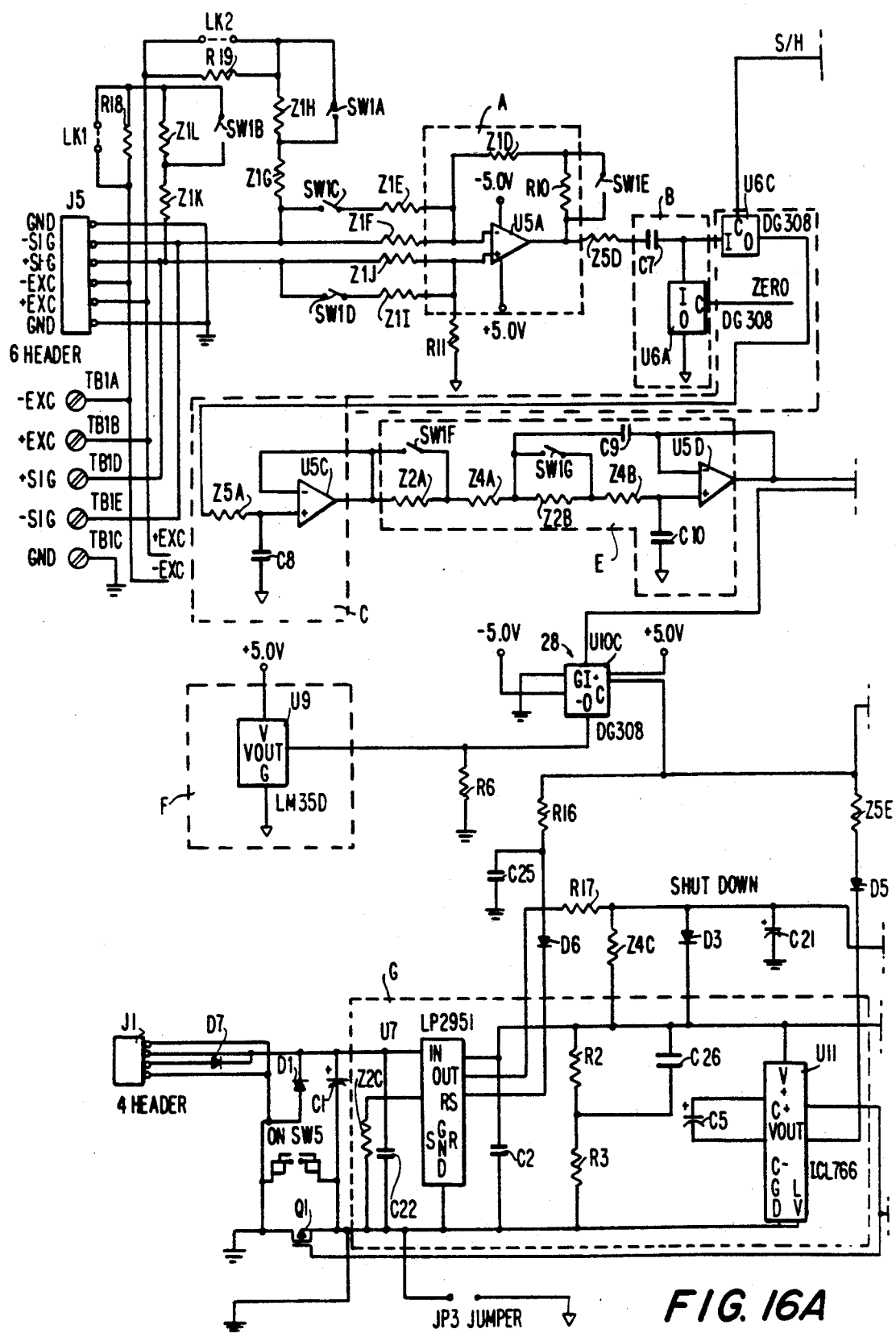
Figure 16B:
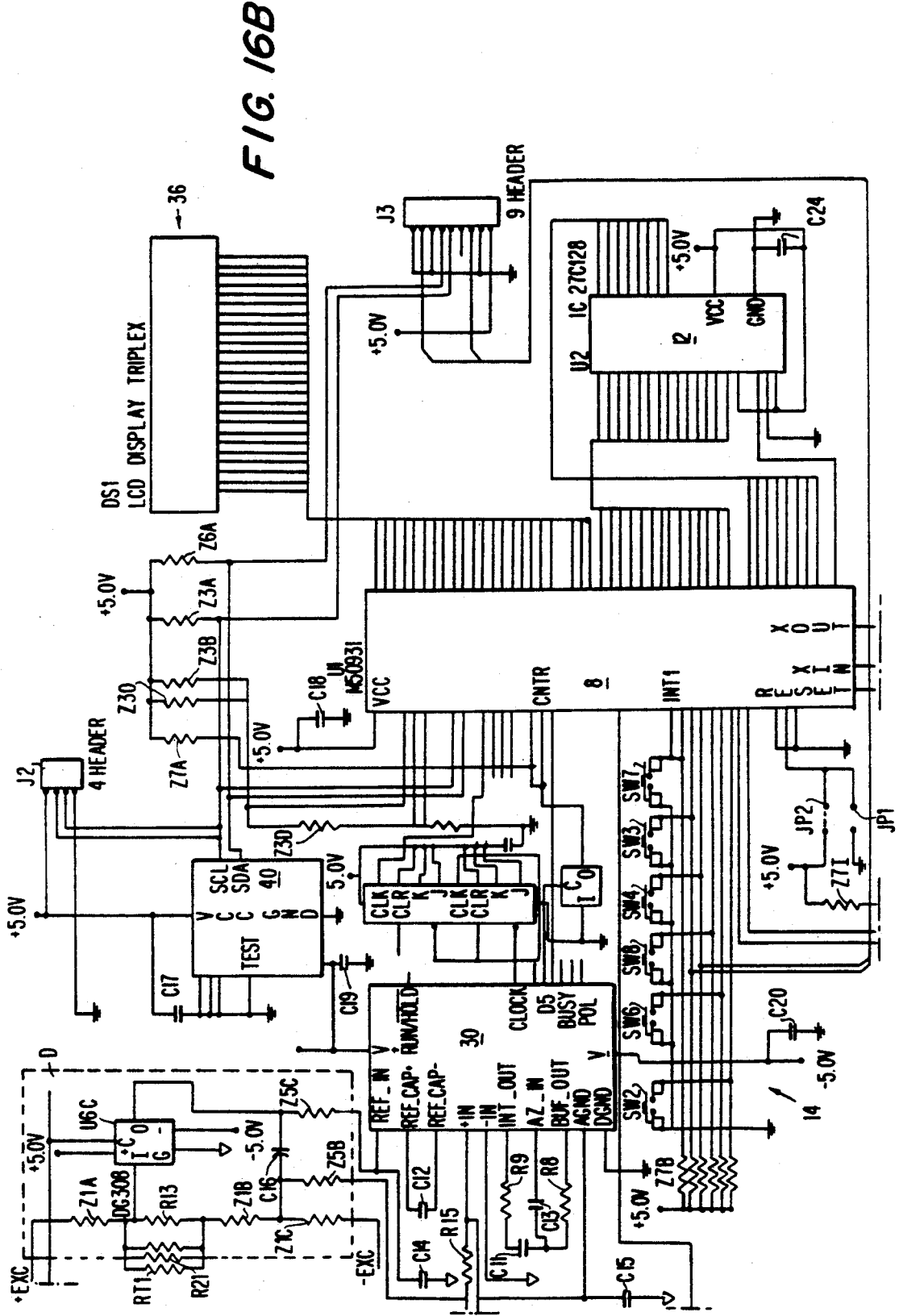
Figure 16C:
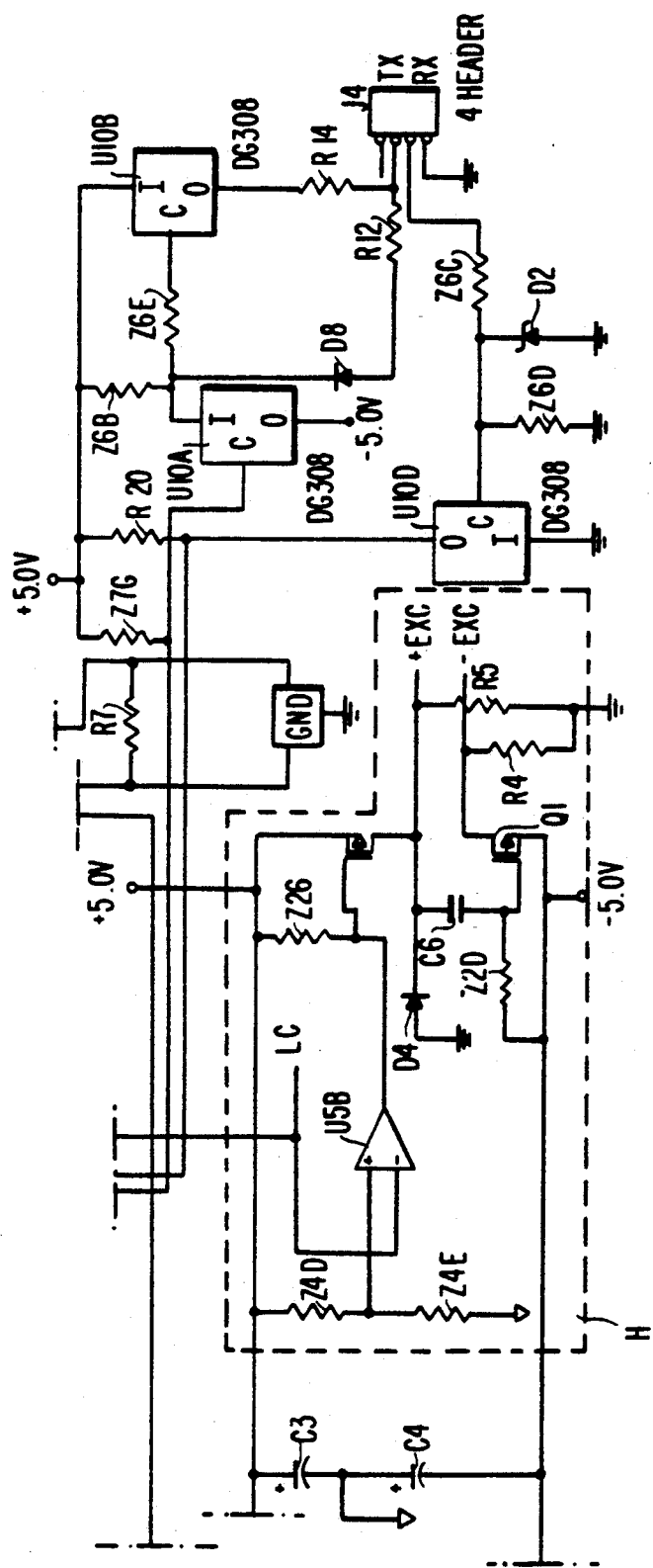

FIG. 16 shows a schematic diagram of a preferred embodiment of the system of FIG. 14. Certain components have been placed in boxes for simplified reference. Box A contains the amplifier circuitry for amplifying the load cell 1 (not shown) output. Box B contains the drift correction circuitry, including capacitor C7 which stores the residual system voltages, and the zero signal line 20.

Box C visualizes the sample-and-hold circuitry including the S/H signal line 24. Box D contains pulse reference 32 circuitry. The pulse reference voltage is stored in capacitor C16. S/H signal line 24 is connected to a switch in both the S/H circuitry, and the pulse reference circuitry. Therefore, when this line is activated, a sample of the load cell output is taken, and a sample of the pulse reference is taken.

Low-pass filter 26 is contained in Box E. The filter output is connected to A/D converter 30 as is the pulse reference output. Box F contains the temperature sensor 34. The temperature sensor output is directed to a microprocessor controlled switch which determines if the temperature sensor output will be directed to A/D converter 30.

The power supply circuitry is substantially contained in Box G. Voltage regulator U7 controls the provision of the necessary DC voltages for the system to be operated, and the voltage inverter U11 provides the negative voltages for the system. These voltages are directed toward the pulse circuitry located in Box H. FET's Q2 and Q3 correspond with switches 4 and as previously described.

Microprocessor 8 is connected to ROM 12 for storing the fixed system program, and EEPROM for storing any particular characteristics of the actual system; i.e., load cell coefficients or temperature sensor characteristics. A control line on pin 19 of microprocessor 8 handles multiple functions. When the microprocessor 8 determines that it is appropriate for the system to enter the sleep mode, this line is actuated to reduce the system voltage and to disengage the inverter U11. However, if this line is only pulsed for a short time, it engages the switch connected to the temperature sensor 34 so that the temperature reading is directed to the A/D converter 30. Preferably, this signal line is not actuated long enough for the system voltage to change, or for the inverter U11 to turn off.

Figure 18:
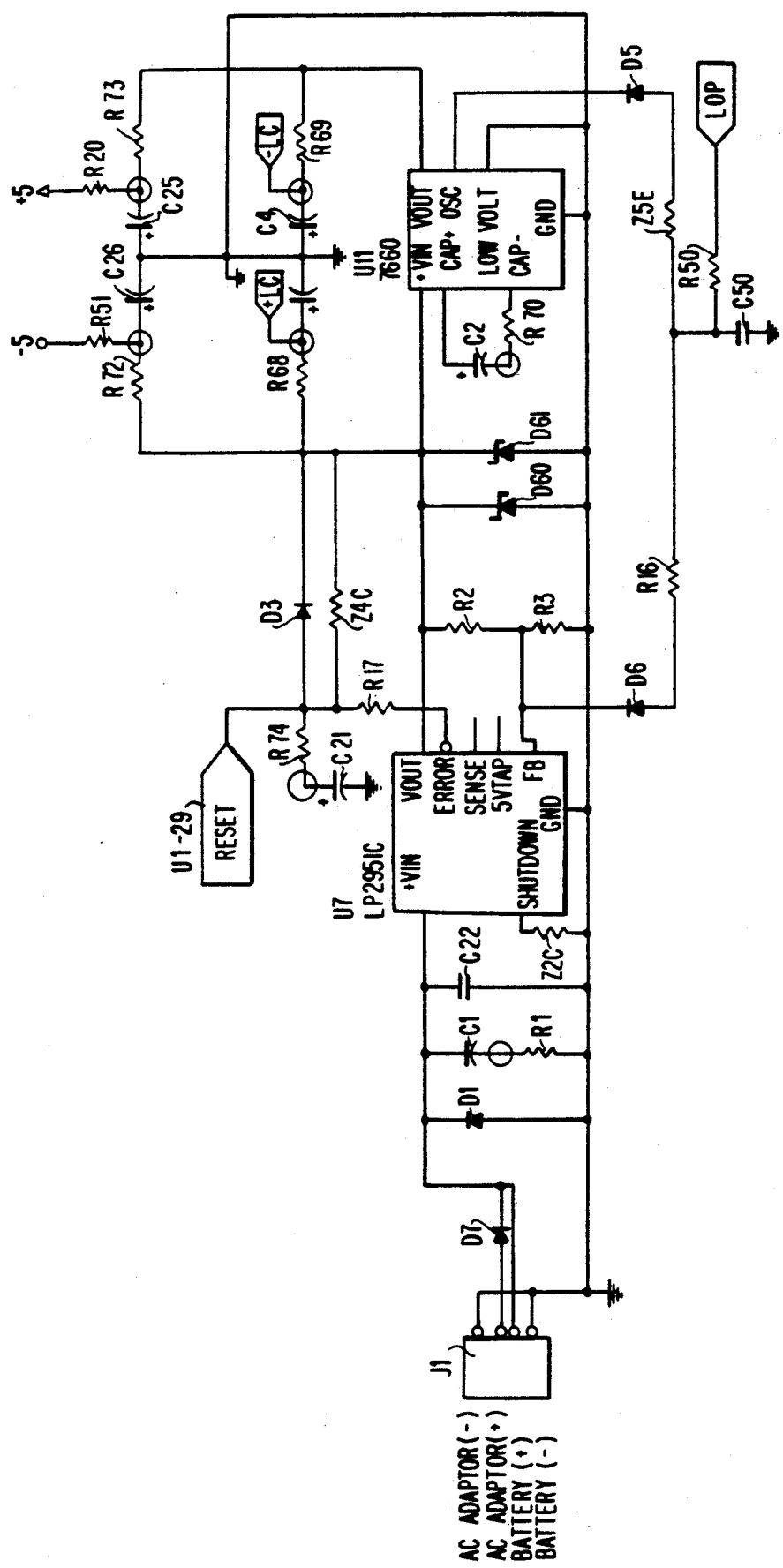

Another advantage of the indicator 200 of the present invention is that it is suitable for use in high explosive environments. In such environments, it is necessary to prevent a spark from occurring anywhere on the circuit boards. Since the present invention operates on low voltages and generates lower heat than previous scales, it is useful in such environments. As shown in FIG. 18, by modifying the circuitry slightly, sparks even due to component failures are eliminated. Redundant zener diodes D60 and D61 insure that if voltage regulator U7 fails, a resultant voltage spike will not result in a spark. Further safety is achieved by placing current limiting resistors in series with any capacitor which could discharge with sufficient charge to spark. Resistors R1, R74, R68, R69, R72, R73, and R70, for example, help eliminate potentially catastrophic stray sparks.

Although the present invention has been described in detail with respect to certain embodiments and examples, variations and modifications exist which are within the scope of the present invention as defined in the following claims.

What is claimed is:

1. A mechanical scale conversion system for converting a scale having a mechanical measuring system into a scale having an electronic measuring system, said scale mechanical measuring system comprising mechanical load receiving means for receiving an applied load, a pillar comprising a beam load rod and means for mechanically transferring a load received by said mechanical load receiving means to said beam load rod means, said load indicator conversion system comprising:
   a transducer means responsive to an applied load for providing an electrical output in response to said applied load, said electrical output varying with the magnitude of said applied load;
   variable tension means for attaching said beam load rod to said transducer means at a desired variable tension level, for directly converting the load transferred to said beam load rod from said mechanical load receiving means into said applied load to said attached transducer means, said applied load being equivalent to said load transferred to said beam load rod;
   electronic display means operatively connected to said transducer means electrical output for providing an electronic display corresponding to said magnitude of said applied load;
   and a housing containing said transducer means and said electronic display means, said housing being mountable on said pillar means for enabling said beam load rod to be mechanically connected to said transducer means;
   whereby said load applied to said mechanical load receiving means is convertible into said electronic display from said electrical output of said transducer means contained within said pillar mounted housing.

2. A load indicator conversion system in accordance with claim 1 wherein said electrical output further varies with variations in temperature of said transducer means, said electronic display means comprising means for converting said electrical output into said electronic display, said system further comprising common temperature sensor means within said housing adjacent said transducer means and said electrical output conversion means for sensing said transducer means associated temperature and compensating for said variations in said associated temperature for providing a temperature compensated electronic display corresponding to said magnitude of said applied load as said electronic display.

3. A load indicator conversion system in accordance with claim 2 wherein said variable tension means for attaching said beam load rod means to said transducer means comprises an S-hook means and an adjustable length load cell cable assembly threadably connected to said transducer means for varying said desired tension level, said S-hook means being mechanically linked to said load cell cable assembly.

4. A load indicator conversion system in accordance with claim 3 wherein said transducer means comprises an analog load cell.

5. A load indicator conversion system in accordance with claim 4 wherein said electronic display means comprises a segmented LCD display means, said means for converting said electrical output into said electronic display comprising analog to digital conversion means.

6. A load indicator conversion system in accordance with claim 1 wherein said transducer means comprises a digital load cell.

7. A load indicator conversion system in accordance with claim 1 wherein said variable tension means for attaching said beam load road to said transducer means comprises an S-hook means and an adjustable length load cell cable assembly threadably connected to said transducer means for varying said desired tension level, said S-hook means being mechanically linked to said load cell cable assembly.

8. A load indicator conversion system in accordance with claim 7 wherein said transducer means comprises an analog load cell.

9. A load indicator conversion system in accordance with claim 1 wherein said transducer means comprises an analog load cell.

10. A load indictor conversion system in accordance with claim 9 wherein said electronic display means further comprises means for converting said analog load cell electronic output into said electronic display.

11. A load indicator conversion system in accordance with claim 10 wherein said electronic display means comprises a segmented LCD display means, said means for converting said electrical output into said electronic display comprising analog to digital conversion means.

12. A load indicator conversion system in accordance with claim 11 wherein said variable tension means for attaching said beam load rod to said transducer means comprises an S-hook means and an adjustable length load cell cable assembly threadably connected to said transducer means for varying said desired tension level, said S-hook means being mechanically linked to said load cell cable assembly.

13. A load indicator conversion system in accordance with claim 10 wherein said variable tension means for attaching said beam load rod to said transducer means comprises an S-hook means and an adjustable length load cell cable assembly threadably connected to said transducer means for varying said desired tension level, said S-hook means being mechanically linked to said load cell cable assembly.

14. A load indicator conversion system in accordance with claim 1 wherein said electronic display means comprises means for providing a checkweigher electronic display as said corresponding electronic display.

15. A load indicator conversion system in accordance with claim 14 further comprising microprocessor control means operatively connected to said transducer means and said electronic display means for controlling the provision of said corresponding electronic display.

16. A load indicator conversion system in accordance with claim 1 further comprising microprocessor control means operatively connected to said transducer means and said electronic display means for controlling the provision of said corresponding electronic display.

17. A load indicator conversion system in accordance with claim 15 wherein said electronic display means comprises a segmented LCD display means.

18. A load indicator conversion system in accordance with claim 16 wherein said electronic display means further comprises means for providing an electronic display of said magnitude of said applied load.

19. A load indicator conversion system in accordance with claim 15 wherein said electronic display means further comprises means for providing an electronic display of said magnitude of said applied load.

20. A load indicator conversion system in accordance with claim 14 wherein said electronic display means further comprises means for providing an electronic display of said magnitude of said applied load.

21. A load indicator conversion system in accordance with claim 2 further comprising microprocessor control means operatively connected to said transducer means, said common temperature sensing means and said electronic display means for controlling the provision of said corresponding electronic display.

22. A load indicator conversion system in accordance with claim 3 wherein said load cell cable assembly further comprises means for tensioning said load cell cable assembly for providing a continuous taut mechanical linkage between said transducer means and said mechanical load receiving means for transferring said received load to said transducer means for providing said applied load to said transducer means.

23. A load indicator conversion system in accordance with claim 7 wherein said load cell cable assembly further comprises means for tensioning said load cell cable assembly for providing a continuous taut mechanical linkage between said transducer means and said mechanical load receiving means for transferring said received load to said transducer means for providing said applied load to said transducer means.

* * * * *